United States Patent [19]

Jones et al.

[11] 4,229,550

[45] Oct. 21, 1980

[54] FLEXIBILIZED VINYL POLYBUTADIENE MALEIMIDE RESINS

[75] Inventors: Robert J. Jones, Hermosa Beach; Robert W. Vaughan, Manhattan Beach; Robert A. Buyny, Redondo Beach; Michael K. O'Rell, Manhattan Beach, all of Calif.

[73] Assignee: TRW Inc., Redondo Beach, Calif.

[21] Appl. No.: 968,331

[22] Filed: Dec. 11, 1978

[51] Int. Cl. ............................................. C08f 279/02
[52] U.S. Cl. .................................. 525/282; 525/334; 525/375
[58] Field of Search ................. 260/836, 879; 526/50, 526/21; 525/282

[56] References Cited

U.S. PATENT DOCUMENTS

| | | | |
|---|---|---|---|
| 2,818,405 | 12/1957 | Kovacic | 526/21 |
| 2,925,407 | 2/1960 | Goldberg | 260/879 |
| 2,989,504 | 6/1961 | Little | 526/50 |
| 3,853,815 | 12/1974 | Lubowitz | 526/21 |
| 3,931,354 | 1/1976 | Sheppard | 260/837 R |
| 4,082,817 | 4/1978 | Imaizumi | 260/879 |

*Primary Examiner*—Paul R. Michl
*Attorney, Agent, or Firm*—John J. Connors; Donald R. Nyhagen

[57] ABSTRACT

Vinyl polybutadiene maleimide prepolymers which are peroxide curable are provided. The prepolymers are formed from the reaction product of a vinyl polybutadiene providing pendant vinyl groups and a maleimide and, more particularly, a mixture of aliphatic maleimides with cycloaliphatic or aromatic maleimides in combination with a peroxide-free radical initiator. The prepolymer is a vinyl polybutadiene backbone structure having grafted maleimide polymers forming cross-linking between polybutadiene backbone segments. The resultant prepolymer can be subsequently cured to a hard resin by heating in the presence of a peroxide-free radical initiator to form cross-linking between vinyl polybutadiene structures through the pendant vinyl groups. The resultant hard resin provides strength retention at elevated temperatures and exhibits a flexibility and strength without being brittle.

33 Claims, No Drawings

FLEXIBILIZED VINYL POLYBUTADIENE MALEIMIDE RESINS

BACKGROUND OF THE INVENTION

The present invention is directed to vinyl polymerizable systems which when cured exhibit strength retention properties at elevated temperatures under moist conditions.

Composite materials are finding ever increasing utility in the structural engineering art. Emphasis is being placed on developing new composites and improved methods and resin systems for binding and holding the composite reinforcing materials together.

While epoxy resins are the most popular, three major deficiencies have become apparent with regard to the state-of-the-art epoxy resin systems for use as composite matrices.

First, is the high amount of resin flow during molding which can be as much as 50 percent of the original resin content. High resin flow may be attributed in some instances to the fact that some epoxy resins are liquid and flow during molding while, in other instances, the epoxy resins require a solvent carrier and retain the solvent during manufacture of the resinous article.

Second, is the requirement for use of autoclaves to provide the essential pressure necessary for the consolidation of resin bound complex parts. This requirement for pressure greatly limits the number of vendors capable of handling the epoxy resins.

Third, is their propensity to absorb moisture which is deleterious to the mechanical properties of high performance structural composites. It has been determined this results principally from absorption of moisture by the epoxy resin matrix. It has further been found that the presence of moisture has more of an influence on mechanical property degradation in glass fiber reinforced composites than for graphite fiber reinforced composites using the same epoxy resin system.

There are two modes of property degradation: initial reversible degradation resulting from plasticization of the epoxy resin matrix by the absorbed moisture and permanent degradation resulting from cracks in the epoxy resin matrix. The initial degradation can be predicted in neat epoxy resin castings based on standard diffusion models. However, the permanent degradation in composites cannot be predicted in any straightforward manner and is influenced by thermal peaks during exposure. A need has existed to provide resin systems for composite structures that do not undergo moisture degradation.

Ideally, such resin should provide the optimum moisture resistance; i.e., be hydrophobic. This feature must be achieved while maintaining suitability to processing by conventional technology and provide satisfactory interlaminar and flexural strength retention at elevated temperatures.

High vinyl content polybutadiene resins provide a base to induce hydrophobic properties. They exhibit, however, several deficiencies. The specific deficiencies are low adhesion to graphite and glass fibers, low elongation and a sharp drop in strength retention at moderately elevated temperatures of about 300° F.

These deficiencies generally were countered by outstanding electrical properties and chemical resistance. Another advantage is that vinyl polybutadiene polymerization can be imparted at low resin flow; i.e., rapid gelation.

High vinyl content polybutadiene modified epoxy resins (hereinafter referred to as epoxy-polybutadiene copolymers) have been provided and are disclosed in U.S. Pat. No. 3,931,354, incorporated herein by reference. The epoxy-polybutadiene copolymer approach provides a compromise in which the excellent 350° F. mechanical properties of the epoxy resins are combined with the hydrophobic character of the vinyl polybutadiene resin. The epoxy-polybutadiene copolymers generally provided acceptable dry strength retention up to about 350° F. While hydrophobic characteristics are imparted by the polybutadiene moiety, such copolymer resin systems, although having a higher strength retention than conventional epoxy resins, were found to exhibit a drop in strength retention on exposure to moisture. Fiber reinforced composites formed from the high vinyl content polybutadiene modified epoxy resins exhibit an ultimate tensile strain to failure of less than about one-half percent. Preferably, a higher strain to failure percentage would provide extra toughness to the composite.

Resin systems having vinyl polybutadiene segments and which cure through vinyl groups on the polybutadiene exhibit some shrinkage upon curing which in the casting and molding arts is preferable minimized. Cross-linking of the vinyl polybutadiene segments is provided to a degree by aromatic bismaleimides. The aromatic bismaleimides, however, are not incorporated into the resin in a homogeneous fashion. This lack of homogeneity is occasioned by the aromatic bismaleimide not being readily soluble in the high vinyl content polybutadiene modified epoxy resins. Also, because of the relatively high melting point of the aromatic bismaleimides (generally greater than 300° F.) they do not melt and mix into the resin prior to the onset of cure.

A resin system comprising copolymers of mixtures of 1,2 and 1,4 vinyl polybutadiene segments and certain aromatic bisimides, which resin upon heating to above 300° F. cures to form bisimide cross-linking between vinyyl polybutadiene backbone structures, have been prepared. A resin system comprised of aromatic bisimide cross-linking between 1,2 and 1,4 vinyl polybutadiene segments is disclosed in co-pending United States Patent Application Ser. No. 877,127 entitled VINYL POLYBUTADIENE BISIMIDE COPOLYMERS, filed on Feb. 13, 1978 and assigned to the same assignee as this application. The vinyl polybutadiene bisimide copolymers provide acceptable dry strength and wet strength retention up to 350° F. and higher. However, while exhibiting a high strength retention under moist conditions at elevated temperatures, the copolymers exhibit a toughness, as measured by the ultimate strain at failure for neat resin coatings, of less than about one percent. Such a strain at failure imparts a degree of brittleness to fiber reinforced composites formed from such copolymers. In addition, such vinyl polybutadienes exhibit shrinking during curing of the pendant vinyl groups. In casting and molding fiber reinforced composites from resins, it is desirable to minimize shrinkage of the resins.

In summary, while suited to low temperature performance, the resin systems of U.S. Pat. No. 3,931,354 fall short of desired retention of strength at elevated temperatures in the presence of moisture and the resin systems of United States Patent Application Ser. No.

877,127, while exhibiting better wet strength retention at elevated temperatures, fall short of desired toughness retention at elevated temperatures, are brittle and have undesired shrinkage levels.

SUMMARY OF THE INVENTION

According to the present invention, there is provided novel maleimide-linked high vinyl polybutadiene prepolymers which cure through pendant vinyl groups in the presence of suitable peroxide catalyst at temperatures of about 300° F. or more, preferably about 350° F. or more. The prepolymers are particularly useful in preparing fiber reinforced resin composites which exhibit a high degree of wet strength retention at temperatures of about 350° F. or more.

The peroxide curable compositions of this invention comprise the reaction product of a vinyl polybutadiene polymer providing pendant vinyl groups capable of high temperature peroxide cure and at least one maleimide polymer. The mixture will cure in the presence of a peroxide capable of initiating reaction between the vinyl polybutadiene and maleimide polymers. The product of the reaction is a maleimide grafted polybutadiene prepolymer capable of curing through pendant vinyl groups in the presence of a peroxide.

The maleimide polymer comprises a maleimide selected from the group consisting of:

(i) an aliphatic bismaleimide of the general formula:

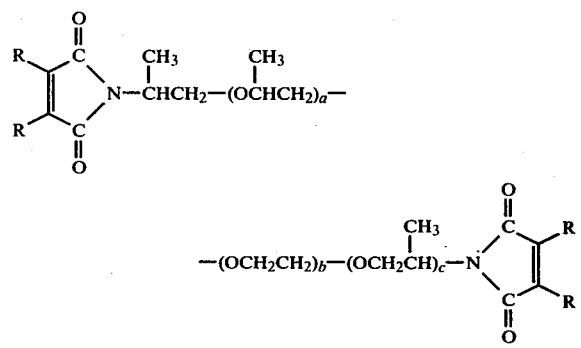

wherein a+c is from about 1 to about 5 and b is from about 13.5 to about 45.5;

(ii) an aliphatic trismaleimide of the general formula:

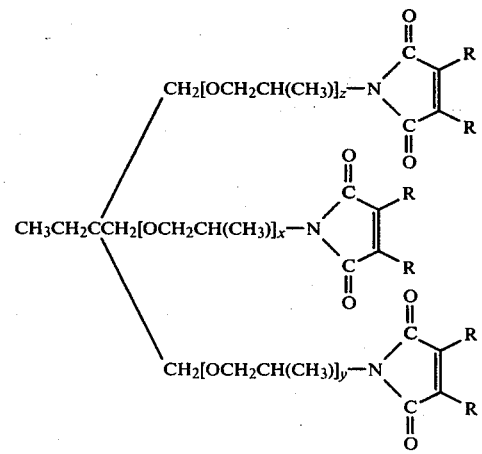

wherein the sum of x, y and z is about at least 1, preferably from about 1 to about 10;

(iii) a cycloaliphatic maleimide of the general formula:

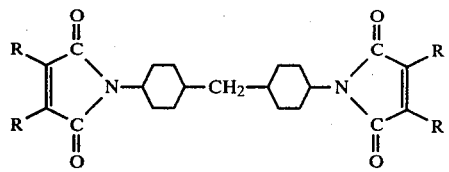

(iv) a cycloaliphatic maleimide of the general formula:

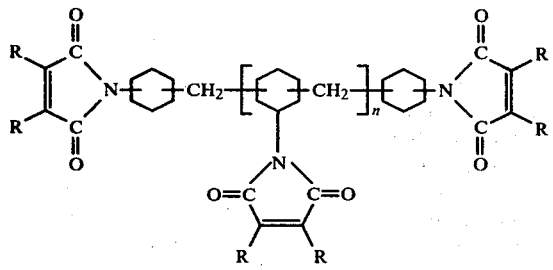

where n is a number from about 0.1 to about 5;

(v) a cycloalphatic maleimide of the general formula:

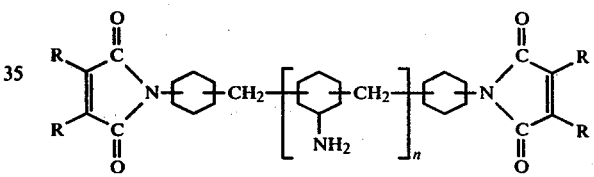

where n is a number from 0.1 to about 5;

(vi) an aromatic maleimide of the general formula:

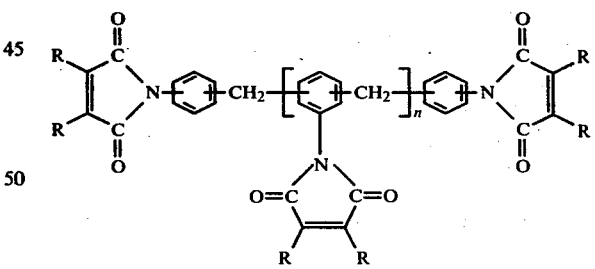

where n is a number from abut 0.1 to about 5;

(vii) an aromatic maleimide of the general formula:

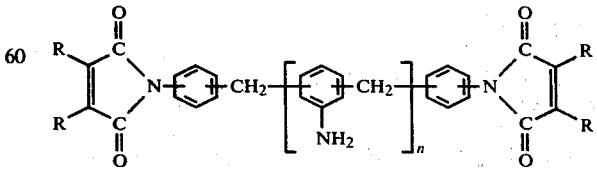

where n is a number from about 0.1 to about 5; and where R in each of the above formulas is independently selected from the group consisting of hydrogen, an aliphatic group containing 1 to 2 carbon atoms, a benzenoid radical, and a halogen.

In particular, a peroxide curable composition is provided by reacting a vinyl polybutadiene polymer providing pendant vinyl groups which is an unterminated or functionally terminated vinyl polybutadiene of a molecular weight from about 500 to about 5000 and at least 80 percent 1,2-vinyl polybutadiene segments.

It is preferred to use a mixture of the above maleimides for reacting with vinyl polybutadiene. The preferred mixture of maleimides comprises a first maleimide selected from the group consisting of maleimide of the general formula:

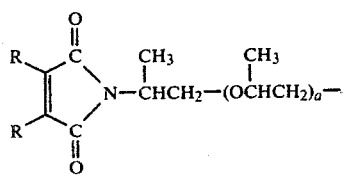

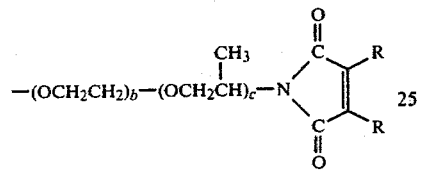

wherein a+c is about 3.5 and b is from 13.5 to about 45.5, and maleimides of the general formula:

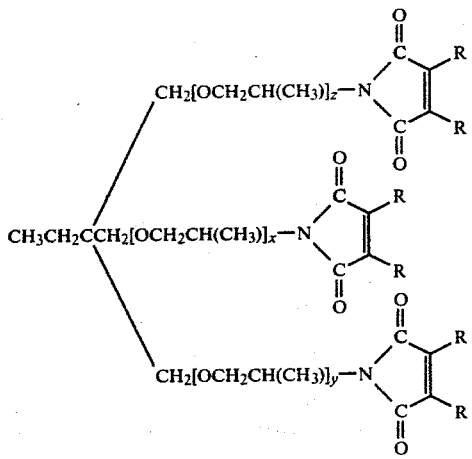

wherein the sum of x, y and z equals about 5.3, and a second maleimide selected from the group consisting of maleimides of the general formula:

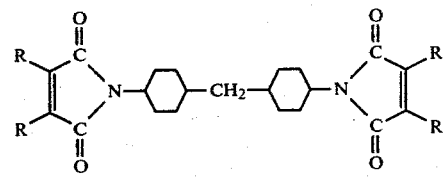

maleimides of the general formula:

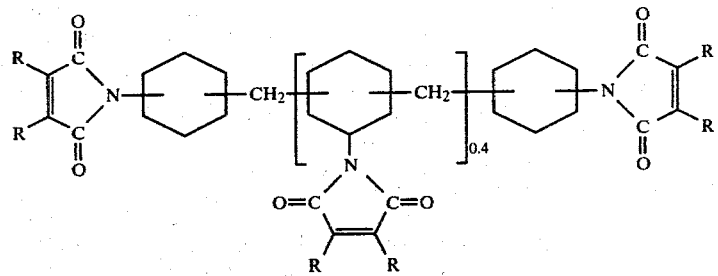

maleimides of the general formula:

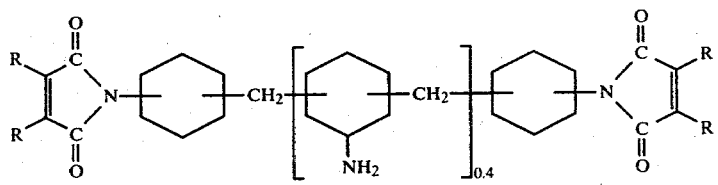

maleimides of the general formula:

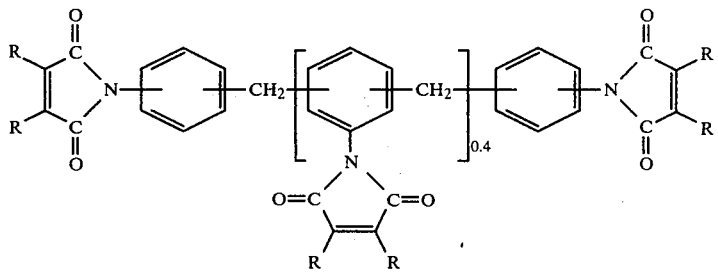

and maleimides of the general formula:

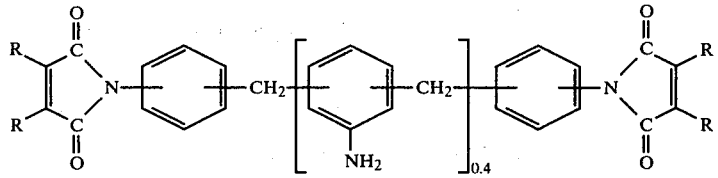

A method for making the compositions and thermosetting resins from such compositions is also provided.

DETAILED DESCRIPTION OF THE INVENTION

The present invention is directed to novel maleimide-linked high vinyl content polybutadiene prepolymers which cure through pendant vinyl groups in the presence of suitable peroxide catalysts at elevated temperatures. The prepolymers of this invention are particularly useful in the fabrication of fiber reinforced resin composites.

The prepolymers comprise a copolymeric system wherein one reactant is a vinyl polybutadiene, and a second reactant is a maleimide or mixture of maleimides selected from the above aliphatic maleimides, cycloaliphatic maleimides and aromatic maleimides. Preferably, the second reactant used in preparing the copolymer is a mixture of an aliphatic maleimide with either a cycloaliphatic or an aromatic maleimide.

The vinyl polybutadiene polymers (hereinafter sometimes referred to as PB) contemplated for use as a reactant preferably are terminated vinyl polybutadiene polymers. When terminated vinyl polybutadiene polymers are employed, terminal groups can include hydroxyl groups, carboxyl groups, epoxy groups and the like. The vinyl polybutadiene polymers useful in the production of the resin compositions of this invention generally comprise at least about 80 percent 1,2-polybutadiene configuration, the balance of the unsaturation being 1,4-polybutadiene configuration. Preferably, the vinyl polybutadiene polymers comprise at least about 90 percent 1,2-polybutadiene. While the molecular weight of the vinylpolybutadiene polymers does not present critical consideration, it is preferred that the molecular weight of the vinyl polybutadiene polymers range from about 500 to about 5000. Higher molecular weight polymers can be used. However, polymers having a molecular weight greater than 5000 are more difficult to process as they are more viscous than the lower molecular weight polymers. The vinyl polybutadiene copolymer component provides the backbone structure for the prepolymer compositions of this invention.

An epoxide terminated polybutadiene may be used and is disclosed in the aforementiond U.S. Pat. No. 3,931,354. A ratio of one equivalent weight of a functionally terminated polybutadiene is reacted with two moles of a diepoxide at moderate temperatures. Although the polybutadiene and the diepoxide react slowly at room temperature, temperatures of approximately 100° F. to 250° F. reduce the viscosity of the reactants and expedite the mixing and reaction of the polybutadiene with the diepoxide.

Examples of diepoxide end-capping agent in which the unmodified groups are functionally active and suitable for the present invention are:

aliphatic polyether diepoxides
epoxy novolacs
bis-epoxydicyclopentyl ether of ethylene glycol
epichlorohydrin/bis phenol A-type
1-epoxyethyl-3,4-epoxycyclohexane
dicyclopentadiene dioxde
limonene dioxide
bis (2,3-epoxypropoxy) benzene
vinylcyclohexane dioxide
3,4-epoxy-6-methylcyclohexylmethyl-3,4-epoxy-6-methylcyclohexane carboxylate
zeaxanthin diepoxide
9,10-epoxy-12-hydroxyoctadecanoic acid triester of glycerol Generally, any aromatic or aliphatic epoxide is suitable, for example, any alkylene epoxide, cycloalkylene epoxide, alkoxyarylene epoxide, arylene epoxide, alkyl-cycloalkylene epoxide, cycloalkene epoxide or alkenecycloalkylene epoxide. Polymers made with aromatic epoxy end-caps generally exhibit better thermal stability than polymers made with aliphatic epoxy end-caps. A diepoxide is preferred such that a functionally reactive end-cap polybutadiene molecule is produced. Upon final cure of the epoxy end-capped polybutadiene molecule, the epoxy groups react with one another to produce a linear chain or block polymer, thereby extending the chain length of the polybutadiene.

The preferred diepoxides for end-capping the polybutadiene are bis(2,3-epoxypropoxy) benzene of the general formula:

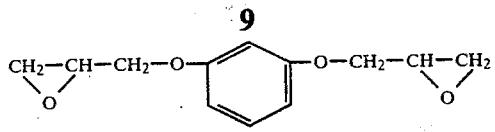

and an aliphatic polyether diepoxide of the general formula:

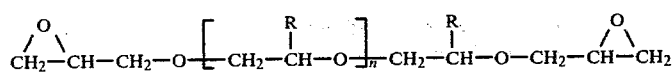

wherein n is from about 3 to about 8 and preferably about 5.6 and wherein each R is independently selected from the group consisting of hydrogen, an aliphatic group containing 1 to 2 carbon atoms, a benzenoid radical and a halogen.

The epoxy end-capping reaction can be further accelerated by the inclusion of a catalyst or epoxy accelerator. Examples of a few of the suitable catalysts or accelerators are:

tertiary aliphatic amines
BF$_3$-etherate
sodamide
zinc oxide
alkaline earth oxides
alkaline earth hydroxides
stannic chloride
sulfuric acid
diethyl zinc—water
trialkyl aluminum—chelating agent
ferrictrialkoxide
strontium amide
strontium alkoxide
calcium amide
calcium alkoxide Other general and sterospecific polymerization catalysts may be determined by referring to a standard text relating to epoxide polymerization.

The maleimide reactant (hereinafter sometimes referred to as MI) graft across the backbone structures to the prepolymer to be formed by this invention providing cross-linking between vinyl polybutadiene backbone structures. The maleimide reactant useful to form cross-linking between the vinyl polybutadiene backbone structures are maleimide polymers which allow some flexibility to the prepolymer system and the resultant polymer after final curing. Flexibility in a prepolymer is desired to provide a toughness such that a composite made from the prepolymer will not be inelastic or brittle so as to fracture under a strain. A composite having flexibility can flex with the force applied. The maleimide reactants we use provide a greater strain at failure value than is provided by the prior polymer systems described above.

Maleimide reactants capable of cross-linking polybutadiene structures and which are capable of imparting flexibility to the cross-linked polymer lattice can be selected from an aliphatic maleimide polymer, cycloaliphatic maleimide polymer, aromatic maleimide polymers and mixtures thereof. The aliphatic maleimide polymers provide a greater flexibility than the cycloaliphatic and aromatic maleimide polymers. By mixing the maleimide polymers to produce a mixed maleimide copolymer system, an effective balance between strength and flexibility is achieved. Preferably, an aliphatic maleimide polymer and either a cycloaliphatic maleimide polymer or an aromatic maleimide polymer are mixed in a one to five to a five to one weight ratio to make a mixed maleimide copolymer system for blending with the polybutadiene copolymer. Such a mixture of maleimide polymers provided suitable strength to the polybutadiene/maleimide composite to be formed while also providing a relatively high strain to failure strength.

The aliphatic maleimide polymer can be a bismaleimide or a trismaleimide. Generally, the aliphatic portion of the bismaleimides comprises a polyaliphatic ether in which each aliphatic either group individually contains from 1 to 6 carbon atoms and is of a molecular weight from about 300 to about 10,000. Aliphatic bismaleimides which are useful comprise bismaleimides having the following general formula:

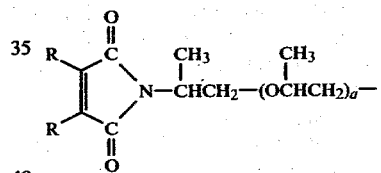

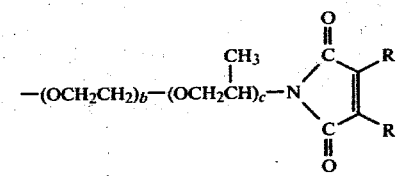

wherein a+c is about 3.5 and b is from 13.5 to about 45.5, each R is independently selected from the group consisting of hydrogen, an aliphatic group containing 1 to 2 carbon atoms, a benzenoid radical and a halogen.

The aliphatic maleimide polymers can be synthesized by thermally condensing maleic anhydride and the appropriate amine in a polar solvent, such as dimethylformamide at 280° F. for about 12 to about 16 hours. An amic-acid is initially formed followed by amidization to the aliphatic maleimide polymer at the elevated temperature. Suitable amines are commercially available, such as diamines manufactured and sold by Jefferson Chemical Company, Inc. under the designation "Jeffamine ED" and are available as products having average molecular weights of 600, i.e., b equals about 13.5; 900, i.e., b equals about 20.5; and 2000, i.e., b equals about 45.5. Mixtures of such amines can be employed in preparing aliphatic bismaleimides and mixtures of formed bismaleimides can also be employed. Suitable aliphatic trismaleimide polymers generally comprise trismaleimide polymers having the following general formula:

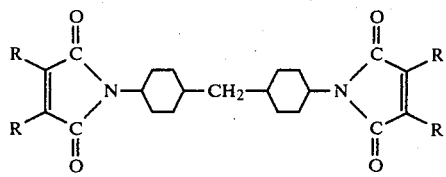

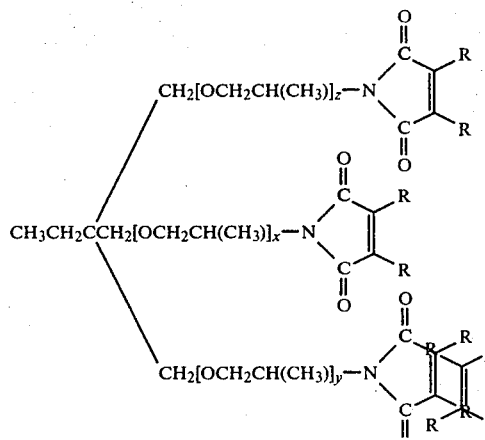

10 wherein R is as defined above, polymers having the general formula:

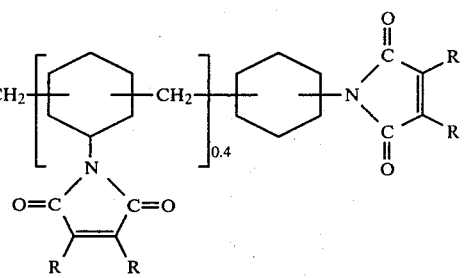

wherein R is as defined above, and polymers having the general formula:

wherein the sum of x, y and z equals about 5.3 and each R is independently selected from the group consisting of hydrogen, an aliphatic group containing 1 to 2 carbon atoms, a benzenoid radical and a halogen.

The aliphatic trismaleimide polymer can be prepared in the same manner as the above aliphatic bismaleimide polymers. A suitable trisamine as a precursor is commercially available, such as "Jeffamine-403" manufactured and sold by Jefferson Chemical Company, Inc.

Aromatic maleimide polymers having utility include polymers having the following general formula:

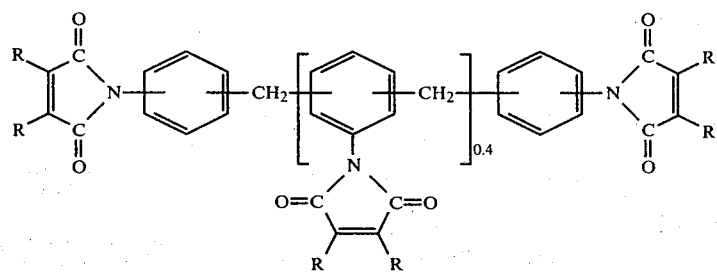

wherein R is as defined above.

The aromatic maleimide polymers are synthesized by forming the amic-acid with the appropriate amine, such as commercially available "JEFFAMINE AP-22" from Jefferson Chemical Company, Inc., and maleic anhydride and then dehydrating the amic-acid with acetic anhydride. The synthesis is conducted in a high boiling polar solvent, such as dimethylformamide. Cycloaliphatic maleimide polymers include polymers having the following general formula:

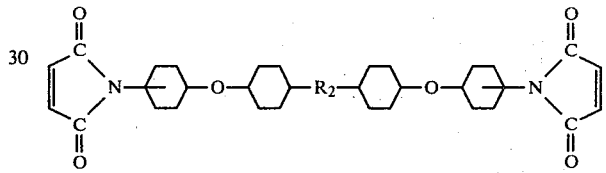

wherein each $R_2$ is selected from the group consisting of $C(CH_3)_2$, $C(CX_3)_2$, S, SO, $SO_2$, $CH_2$, $CX_2$, O and NH and wherein X is a halogen.

The cycloaliphatic maleimide polymers are synthesized without the use of a high boiling polar solvent. These maleimide polymers are formed by dissolving maleic anhydride in chloroform to form about a 20 percent solids solution. The appropriate diamine or polyamine is also dissolved in chloroform at about a 20 percent solids level. The amine solution is added dropwise to a vigorously stirred solution of maleic anhydride. The reaction solution is maintained at about 35° F. to about 50° F. After the amine solution is added, the resulting slurry of precipitated amic-acid is stirred for an additional 30 minutes to ensure complete reaction. The solution is filtered and the solid amic-acid is washed with chloroform and dried. A solution of three moles of acetic anhydride and 0.3 moles of sodium acetate for every equivalent of amic-acid is then prepared. While stirring the acetic anhydride solution vigorously, the amic-acid is slowly added. A nitrogen inlet is introduced, and a water bath is placed around the reaction flask. The temperature of the mixture is slowly raised at about the race of less than 2° F. per minute until the suspension turns clear, which usually occurs at about 120° 1 F. to about 200° F., depending on the amine which is used. The temperature is maintainined for about 60 minutes. The solution is cooled, diluted with a water immiscible solvent, such as methylene chloride. This is washed several times with water until the acqueous solution is neutral.

The cycloaliphatic maleimide is characterized by melting point determination and by infrared spectroscopy. A cycloaliphatic maleimide polymer (hereinafter referred to as BMCM), having the above bis-cyclohexyl methane structure wherein R is hydrogen, was prepared in the above-described manner and had a melting point of 153° F. to about 160° F. A cycloaliphatic maleimide polymer, having the above general formula (5) wherein R is hydrogen, had a softening point of 248° F.

The cycloaliphatic maleimide polymers, having the above general structures, can exist in varying geometric configurations due to the cis-trans configurations of the cyclohexene structure. For example, bismethylcyclohexenyl maleimide (BMCM) can be in a cis-cis configuration, cis-trans configuration, or a trans-trans configuration. All of the configurations can provide cross-linking between vinyl polybutadiene segments. However, as the strength of the resulting prepolymer or polymer upon curing at elevated temperatures depends upon the particular maleimide polymer, it also is dependent upon the configuration of the maleimide polymer cross-linking the polybutadiene segments. In the present example of BMCM, the trans-trans configuration has a softening point about 50° to 100° C. higher than the cis-cis configuration. Therefore, to obtain a prepolymer system providing greater strength at higher temperatures, trans-trans configuration of the cycloaliphatic groups is preferred. The cis-cis and cis-trans configurations, because of their lower softening temperatures, provide easier processability during the forming of the copolymer and the prepolymer system. In the practice herein the case of processability is balanced with the greater strength at elevated temperatures in selecting a cycloaliphatic maleimide polymer. In a preferred practice and embodiment utilizing a cycloaliphatic maleimide, a cycloaliphatic maleimide that is about 10 to about 90 percent cis isomer (cis-cis and cis-trans) is mixed with the vinyl polybutadiene and cured with heat to form cycloaliphatic maleimide cross-linking bridges that are about 90 to about 10 percent trans-trans configuration. Preferably, the initial cycloaliphatic maleimide is about 80 percent cis isomer and, upon curing or post-curing, provides at least about 80 percent trans-trans configuration.

Although the prepolymer has been described as a combination of vinyl polybutadiene and maleimide, prepolymers can be made using a combination of vinyl polybutadiene and tetrahydro-phthalimide. The tetrahydro-phthalimide can be made in a manner similar to the maleimide except phthalic anhydride is used rather than maleic anhydride.

A peroxide-curable prepolymer composition capable of curing through vinyl cure by the application of heat and in the presence of a suitable vinyl-cure initiating catalyst is formed by reacting a polybutadiene reactant having pendant vinyl groups and capable of high temperature peroxide cure with a maleimide reactant selected from the group consisting of an aliphatic maleimide, a cycloaliphatic maleimide, an aromatic maleimide and mixtures thereof. For example, an aliphatic maleimide copolymer, having the above-identified formula, is combined with a maleimide copolymer that is a cycloaliphatic maleimide polymer, an aromatic maleimide polymer or mixture thereof.

It is preferred that the maleimide reactant of the peroxide-curable prepolymer be a mixture of an aliphatic maleimide and a cycloaliphatic maleimide or an aromatic maleimide in a ratio from about one to five to about five to one. A mixture of aliphatic and cycloaliphatic or aromatic maleimides is preferred because such a mixture provides a balance of flexibility and strength. A more preferred maleimide copolymer comprises a mixture of an aliphatic trismaleimide and a cycloaliphatic maleimide in a ratio from about one to five to about five to one.

The polybutadiene copolymer comprises up to about 40 percent by weight of the peroxide-curable prepolymer composition. When a mixed maleimide copolymer is used to form the peroxide-curable prepolymer, the aliphatic maleimide comprises up to about 20 percent by weight of the prepolymer composition and the cycloaliphatic maleimide or aromatic maleimide or mixtures thereof, comprises at least 20 percent by weight the peroxide curable prepolymer composition.

One possible reaction mechanism is that the maleimides (MI) react to form cross-linkages between polybutadiene structures by a free radical mechanism in which an initiating free radical forms a free radical on one end of a pendant vinyl group of the polybutadiene copolymer. Generally, this reaction occurs at about 250° F. to below about 300° F. under conditions which substantially prevent the formation of cross-linking between the pendant vinyl groups on the vinyl polybutadiene backbone structures. At temperatures of 300° F. or greater, preferably 350° F., cross-linking through the pendant vinyl groups will be induced to yield a final thermoset resin. The free radical reactions are initiated by at least one organic peroxide-free radical initiator selected from the following:

di-t-butyl peroxide
n-butyl-4,4-bis(tertiary butylperoxy)valerate
2,5-dimethyl-2,5-bis(tertiary butylperoxy)hexane
5-butyl perbenzoate
dicumyl peroxide
methyl ethyl ketone peroxide
cumene hydroperoxide
di-n-methyl-t-butyl percarbamate
lauroyl peroxide
acetyl peroxide
decanoyl peroxide
t-butyl peracetate
5-butyl peroxyisobutyrate The peroxides are selected depending on whether the low temperature graft polymerization or high temperature vinyl polymerization is to be perfected.

The prepolymer has the general structure of a vinyl polybutadiene backbone with maleimide cross-linking is cured through the pendant vinyl groups. The curing reaction consists of a free radical mechanism wherein thee is formed cross-linking between the vinyl polybutadiene backbone structures through the pendant vinyl groups. The prepolymer is reacted with a free radical initiator suitable to bring about the cure and cross-linking of the pendant vinyl groups at a temperature of at least about 300° F., preferably about 350° F. or more. Such a high temperature free radical initiator peroxide can be any convenient free radical such as an organic selected from the above list of organic peroxides. The peroxide is employed in from about 2 to about 20 percent, preferably 2 to about 10 percent by weight of the prepolymer for vinyl cure.

The vinyl polybutadiene bisimide resins of this invention exhibit improved moisture resistance when employed in composite materials. It is known that the hydrophobic character of a resin is related to its total oxygen content. This, in turn, is related to the strength loss of the composite material when fully saturated. Therefore, it is highly desirable to minimize the oxygen content of a resin system to increase the wet strength of the composite material. Consequently, it is desirable to keep the ratio of vinyl polybutadiene to maleimide in the copolymer as high as possible in order to obtain optimum hydrophobicity. However, vinyl polybutadiene maleimide resins exhibit greatest dry strength retention when the vinyl polybutadiene to bisimide ratio is lower than that desirable to maintain greatest wet strength retention. One must, therefore, balance the ratio of vinyl polybutadiene to maleimide to obtain the optimum moisture resistance and dry strength characteristics.

The following examples are presented to illustrate the various features of the invention and are not intended to be limiting.

EXAMPLES 1–13

In these Examples 1–13, differing formulations of a peroxide curable prepolymer composition were prepared. The prepolymer was used to form a neat resin in methyly ethyl ketone which was removed by vacuum distillation prior to neat resin molding. The prepolymer formulations were placed onto a preheated mold at about 150° F. and spread over the mold surface. The prepolymer formulation and mold were degassed in a vacuum oven at about 150° F. The mold containing the degassed prepolymer was placed into a preheated press about 150° F., and cured at the indicated temperatures in the following Tables 1A and 1B. The cured resin was cooled to room temperature in the mold before removal.

The neat resin physical and mechanical properties were then determined. The results of the tests are reported in the following Tables 1A and 1B wherein the formulations are expressed as parts by weight (pbw).

TABLE IA

| Formulation | Ex. 1 | Ex. 2 | Ex. 3 | Ex. 4 | Ex. 5 | Ex. 6 | |
|---|---|---|---|---|---|---|---|
| Ingredient | | | | | | | |
| Polybutadiene | 100 | 100 | 100 | 100 | 100 | 100 | |
| Diepoxide | 10.3 | 10.3 | 10.3 | 10.3 | 10.3 | 10.3 | |
| Maleimide I | 20 | 20 | 20 | 20 | 20 | 40 | |
| Maleimide II | 90 | 135 | 135 | 135 | 135 | 100 | |
| Maleimide III | | | | | | | |
| Maleimide IV | | | | | | | |
| Peroxide (I) | 11.0 | 8.4 | 13.3 | 13.3 | | 7.5 | |
| Peroxide (II) | | | | | 13.3 | | |
| Neat Resin Properties | | | | | | | |
| Cure temp./time °F./hr. | 315/1 | 315/1 | 315/1 | 230/1 | 335/1 | 315/1 | 350/16 |
| Shrinkage, linear, % | 2.4 | 3.3 | 2.2 | 2.0 | 2.3 | 2.0 | 2.0 |
| volume, % | 7.5 | 7.8 | 4.8 | 4.7 | 5.5 | 5.4 | 5.4 |
| Strain at failure, tensile, % | | | | | | | |
| flexure, % | 1.4 | 1.5 | 1.2 | 1.2 | 1.4 | 1.8 | 1.7 |
| Strength, tensile, ksi | | | | | | | |
| flexure, ksi | 6.0 | 5.9 | 5.5 | 5.3 | 7.2 | 7.9 | 7.5 |
| Modulus, tensile, Msi | | | | | | | |
| flexure, Msi | .42 | .41 | .47 | .46 | .50 | .45 | .45 |
| Density, g/cc | 1.108 | 1.106 | 1.156 | 1.176 | 1.163 | 1.133 | 1.182 |
| Equilibrium weight gain, (100% R.H., 160° F.), % w/w | 1.8 | 1.1 | 2.0 | | 2.5 | | |

TABLE IB

| Formulation | Parts by Weight | | | | | | | | |
|---|---|---|---|---|---|---|---|---|---|
| | Ex. 7 | | Ex. 8 | | Ex. 9 | Ex. 10 | Ex. 11 | Ex. 12 | Ex. 13 |
| Ingredient | | | | | | | | | |
| Polybutadiene | 100 | | 100 | | 100 | 100 | 100 | 100 | 100 |
| Diepoxide | 7.4 | | 10.3 | | 7.4 | 10.3 | 10.3 | 10.3 | 13.3 |
| Maleimide I | 50 | | 40 | | 50 | 50 | | 25 | |
| Maleimide II | 150 | | | | | | | | |
| Maleimide III | | | 100 | | 150 | 150 | 150 | 125 | |
| Maleimide IV | | | | | | | | | 31.2 |
| Peroxide (I) | | | 2.5 | | 9.2 | 3.1 | 2.6 | | |
| Peroxide (II) | 9.2 | | 5.0 | | | 6.1 | 5.2 | 7.8 | 7.2 |
| Neat resin Properties | | | | | | | | | |
| Cure temp./time °F./hr. | 355/1 | 350/16 | 335/1 | 350/16 | 290/1 | 350/16 | 350/1 | 350/1 | 350/1 |
| Shrinkage, linear, % | 1.6 | 1.6 | 2.1 | 2.1 | 1.8 | 1.8 | 2.1 | 1.3 | 2.4 | 4.7 |
| volume, % | 4.9 | 4.9 | 5.6 | 5.6 | 4.6 | 4.6 | 5.0 | 3.5 | 5.9 | |
| Strain at failure, tensile, % | | | | | | | .74 | .44 | | |
| flexure, % | 1.4 | 1.1 | 2.6 | 3.3 | 2.0 | 2.6 | 2.0 | 1.9 | 3.1 ± 1.2 | 2.4 |
| Strength, tensile, ksi | | | | | | | 3.0 | 2.2 | | |
| flexure, ksi | 6.7 | 5.3 | 10.3 | 12.0 | 8.2 | 10.0 | 9.6 | 9.3 | 9.4 ± 1.8 | 6.0 |
| Modulus, tensile, Msi | | | | | | | | | | |
| flexure, Msi | .47 | .50 | .42 | .42 | .41 | .41 | .50 | .51 | 0.41 ± 1.8 | |
| Density, g/cc | 1.182 | 1.129 | 1.129 | 1.129 | 1.129 | 1.129 | 1.140 | 1.135 | 1.111 | |
| Equilibrium weight gain, | | | | | | | | | | |

TABLE IB-continued

| Formulation | Parts by Weight | | | | | | |
|---|---|---|---|---|---|---|---|
| | Ex. 7 | Ex. 8 | Ex. 9 | Ex. 10 | Ex. 11 | Ex. 12 | Ex. 13 |
| 100% R.H., 160° F.), % w/w | 3.3 | 2.7 | 3.7 | | | | |

In all of the examples the vinyl polybutadiene was a carboxyl terminated vinyl polybutadiene of a molecular weight of about 1000 and about 90 percent 1,2-vinyl polybutadiene segments.

As indicated in some of the examples, the vinyl polybutadiene was chain-extended vinyl polybutadiene with a diepoxide of the formula:

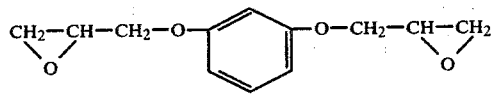

using a chain-extending initiator of chromium octoate at about 1.2 parts by weight.

Maleimide I in Tables IA and IB has the formula:

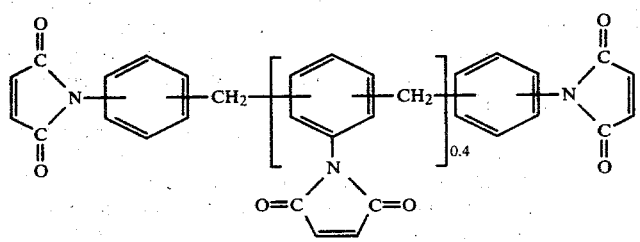

wherein the sum of x, y and z equals about 5.3.
Maleimide II has the formula:

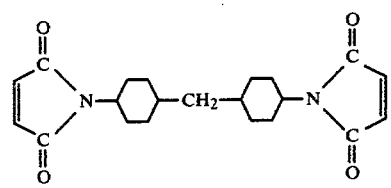

and, Maleimide IV has the formula:

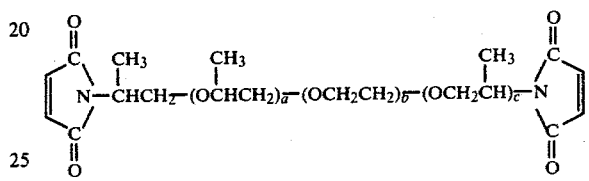

wherein a+b+c=17.0

The maleimide graft initiating peroxide was 2,5-dimethyl-2,5-di(t-butylperoxy)hexane or t-butyl perbenzoate.

The peroxide initiator for curing the vinyl groups was 2,5-dimethyl-2,5-di(t-butylperoxy)-hexyne-3.

EXAMPLES 14–23

The following examples were all conducted in every essential detail as Examples 1–13.

The formulations for the prepolymer compositions are listed in the following Table II and are expressed as parts by weight. Also listed are the results of the physical and mechanical testing of neat resins prepared from such formulations.

Prepreg tapes were made from the prepolymers and composites made therefrom. The resulting composites were also tested for their strength characteristics which are listed in Table II.

In Table II the Maleimide V has the formula:

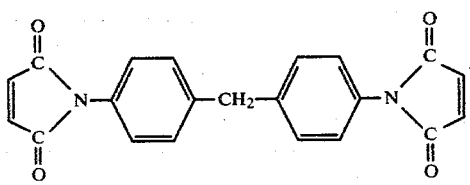

Maleimide III has the formula:

TABLE II

| Constituents | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|
| Polybutadiene | 100 | 100 | 100 | 100 | 100 | 100 | 100 | 100 | 100 | 100 |
| Diepoxide | 13.3 | 13.3 | 13.3 | 13.3 | 13.3 | 13.3 | 13.3 | 13.3 | 13.3 | 13.3 |
| Chain Extending Initiator | 1.2 | 1.2 | 1.2 | 1.2 | 1.2 | 1.2 | 1.2 | 1.2 | 1.2 | 1.2 |
| Maleimide I | 31.2 | | | | | | | | | |
| Maleimide VI | | 31.2 | | | | | | | | |
| Maleimide VII | | | 31.2 | 31.2 | | | | | | |
| Maleimide VIII | | | | | 25.0 | | | | | |
| Maleimide II | | | | | | 25.0 | | | | |
| Maleimide III | | | | | | | 25.0 | 50.0 | | |
| Maleimide V | | | | | | | | | 25.0 | |
| Peroxide | 7.2 | 7.2 | 7.2 | 7.2 | 6.9 | 6.9 | 6.9 | 8.2 | 6.9 | 5.7 |
| Neat Resin Properties | | | | | | | | | | |
| Ultimate Strain, % | 3.1 | 4.0 | 3.0 | | .8 | 1.6 | 1.08 | 1.45 | .6 | 1.7 |
| Linear Shrinkage, % | 4.5 | 4.8 | 4.7 | | 3.7 | 4.2 | 3.7 | 3.5 | 4.0 | 5.0 |
| Volume Shrinkage, % | 9.4 | 12.1 | 9.8 | | 6.9 | 8.2 | 8.2 | 7.4 | 7.8 | 10.5 |
| Tensile Modulus, Msi | .31 | .27 | .32 | | .35 | .40 | .34 | .37 | .33 | .34 |
| Tensile Strength, Ksi | 6.6 | 6.2 | 7.0 | | 2.7 | 5.8 | 3.8 | 5.3 | 1.6 | 4.73 |
| Density, g/cc | 1.06 | 1.07 | 1.07 | | 1.06 | 1.08 | 1.07 | 1.08 | 1.09 | 1.06 |
| Composite Properties | | | | | | | | | | |
| Flexural Strength, Ksi | | | | | | | | | | |
| R.T. | 194 | 140 | 83 | 161 | 162 | 176 | 163 | 173 | 205 | |
| 350° F. | 62 | 60 | 50 | 47 | 81 | 93 | 74 | 97 | 134 | |
| 350° F. (w) | 31 | 33 | | 39 | 32 | 47 | 39 | 39 | | |
| Shear Strength, Ksi | | | | | | | | | | |
| R.T. | 10.4 | 8.4 | 7.6 | 9.3 | 10.4 | 10.8 | 10.3 | 10.5 | 9.6 | |
| 350° F. | 4.2 | 3.5 | 4.0 | 3.0 | 5.1 | 6.1 | 5.5 | 6.3 | 4.9 | |
| 350° F. (w) | 1.9 | 1.8 | | 1.5 | 2.2 | 2.8 | 1.9 | 2.2 | | |
| Density, g/cc | 1.46 | 1.45 | 1.43 | 1.48 | 1.47 | 1.45 | 1.45 | 1.45 | 1.48 | |
| Resin Content, % w/w | 28.9 | 30.9 | 29.4 | 26.5 | 27.8 | 32.0 | 31.3 | 31.6 | 31.8 | |
| Void Volume, % w/w | 1.1 | 1.1 | 3.2 | 1.3 | 1.4 | 1.0 | 1.2 | 1.0 | .3 | |
| Fiber Volume, % w/w | 59.6 | 57.0 | 57.4 | 61.9 | 60.1 | 56.0 | 56.4 | 56.5 | 57.4 | |
| Prepreg Properties: | | | | | | | | | | |
| Volatile Content, % w/w | 1.0 | 1.5 | 1.6 | 1.0 | .7 | 1.5 | .8 | .7 | .7 | |
| Resin Content, % w/w | 30.0 | 30.3 | 30.3 | 32.4 | 31.9 | 30.4 | 31.5 | 31.1 | 35.0 | |

Maleimide VI has the same formula as Maleimide IV with the exception that $a+b+c=5.6$;

Maleimide VII has the same formula as Maleimide IV with the exception that $a+b+c=2.6$; and Maleimide VIII is the saturated equivalent of Maleimide II.

Composites were formed in Examples 13, 14, 15 and 18 in a vacuum bag at 15 psi pressure. The heat-up rate was about 3° to 4° F. per minute with a 60 minute dwell at 270° F. and a 60 minute cure at 350° F. The composites formed were post-cured for 16 hours at 350° F.

Composites were formed for Examples 16, 17, 19 and 20 using 50 psi positive pressure. Heat-up rate was about 3° to 4° F. per minute with a 60 minute dwell at 270° F. and a 60 minute cure at 350° F. All the composites were post-cured for 16 hours at 350° F. The composite formed in Example 21 was fabricated in a press mold with 50 psi positive pressure. Heat-up rate was about 8° to about 10° F. per minute with a 120 minute cure at 350° F. The composite was post-cured at 350° F. for 16 hours.

EXAMPLES 24-37

The utility of the prepolymer compositions was demonstrated in Examples 24-35 wherein the resin formulation of Examples 10 and 11 were used to form composite materials.

The prepolymer used in Examples 36 and 37 had the following formulation in parts by weight with the terms defined as in the above examples:

| | |
|---|---|
| polybutadiene | 100.0 |
| diepoxide | 10.3 |
| chromium octoate | 0.28 |
| maleimide I | 50.0 |
| maleimide II | 150.0 |
| t-butyl perbenzoate | 3.1 |
| vinyl cure initiator | 6.1 |

A prepreg tape was formed using a production tape machine incorporating a graphite fiber. The graphite fibers tested were Celion 6000, a commercially available graphite fiber from Celanese and Hercules AS, a commercially available graphite fiber from Hercules, Inc.

The prepreg tapes were solvent impregnated from methylethylketone or mixtures of methylethylketone and acetone and dried for about 2 to 4 hours at 160° F. to lower volatile contents to the levels indicated in Table III.

Composites were fabricated in a press using a 3 inch by 4 inch mold. The prepreg tape was placed in the cold mold and loaded into a press preheated to about 200° F. The mold was held under contact pressure for 10 minutes and then pressure was applied and the press heated to 350° F. at a heat-up-rate of about 2° F. per minute. The composites were cured and post-cured for 16 hours at 350° F.

The results of strength tests of such composites are given in Table III.

TABLE III

| Formulation | Ex. 24 | Ex. 25 | Ex. 26 | Ex. 27 | Ex. 28 | Ex. 29 | Ex. 30 |
|---|---|---|---|---|---|---|---|
| Prepreg Properties | | | | | | | |
| | Hercules | Hercules | Hercules | Hercules | Hercules | Hercules | Hercules |

TABLE III-continued

| Fiber | AS | AS | AS | AS | AS | AS | AS |
|---|---|---|---|---|---|---|---|
| Prepolymer | Ex. 10 | Ex. 10 | Ex. 10 | Ex. 10 | Ex. 11 | Ex. 11 | Ex. 11 |
| Prepolymer Content, % w/w | 31.5 | 31.5 | 31.5 | 36.5 | 33.3 | 33.0 | 33.3 |
| Volatile Content, % w/w | 1.0 | 1.0 | .8 | | 1.1 | | .5 |
| Composite Properties | | | | | | | |
| Flexural Strength, psi | | | | | | | |
| R.T. | 220 | 227 | 254 | | 273 | | 261 |
| 350° F. | — | — | 154 | | 157 | | 137 |
| 350° F. (weight gain, % w/w) | — | — | 61 (.92) | | 66 (.97) | | — |
| Shear Strength, psi | | | | | | | |
| R.T. | 11.8 | 10.6 | 12.6 | 12.4 | 12.6 | 11.8 | 12.3 |
| 350° F. | — | — | 6.3 | | 7.1 | | 6.5 |
| 350° F. (weight gain, % w/w) | — | — | 3.4 (.84) | | 3.7 (.90) | | — |
| Density, g/cc | 1.510 | 1.433 | 1.537 | 1.477 | 1.470 | 1.496 | 1.476 |
| Resin Content, % w/w | 28.2 | 31.0 | 26.6 | 34.4 | 31.6 | 30.5 | 30.7 |
| Void Content, % w/w | 2.0 | 4.4 | .7 | 1.2 | 2.7 | 1.1 | 2.6 |
| Fiber Volume, % w/w | 60.9 | 56.2 | 60.4 | 54.3 | 56.4 | 58.6 | 57.4 |
| Flow, % w/w | 3.3 | 1.8 | 5.0 | 3.4 | 1.8 | 1.8 | 4.4 |
| Processing Pressure | 50 | 25 | 100 | 100 | 100 | 100 | 200 |

| Formulation | Ex. 31 | Ex. 32 | Ex. 33 | Ex. 34 | Ex. 35 | Ex. 36 | Ex. 37 |
|---|---|---|---|---|---|---|---|
| Prepreg Properties | | | | Celion 4000 | Celion 4000 | | |
| Fiber | Hercules AS | Hercules AS | Celion 6000 Unsized | Epoxy Size | Imide Size | Hercules AS | Hercules AS |
| Prepolymer | Ex. 10 | Ex. 11 | Ex. 11 | Ex. 11 | Ex. 11 | | |
| Prepolymer Content, % w/w | 34.0 | 33.3 | 34.7 | 34.0 | 34.0 | 34.0 | 34.0 |
| Volatile Content, % w/w | 1.0 | .9 | .6 | | | 1.0 | 1.0 |
| Composite Properties | | | | | | | |
| Flexural Strength, psi | | | | | | | |
| R.T. | 268 | 259 | 279 | 281 | 253 | 264 | |
| 350° F. | — | 154 | 111 | 137 | 183 | 184 | |
| 350° F. (weight gain, % w/w) | 70 (1.00) | 67 (.93) | — | — | — | 66 | |
| Shear Strength, psi | | | | | | | |
| R.T. | 11.6 | 11.8 | 10.7 | 12.3 | 11.8 | 10.6 | 10.2 |
| 350° F. | 7.1 | 7.1 | 6.8 | 7.0 | 5.4 | 7.0 | |
| 350° F. (weight gain, % w/w) | 3.0 (.94) | 3.5 (.93) | — | — | — | 3.5 | |
| Density, g/cc | 1.535 | 1.478 | 1.500 | 1.519 | 1.469 | 1.524 | 1.529 |
| Resin Content, % w/w | 26.5 | 31.5 | 28.0 | 28.5 | 30.5 | 30.0 | 28.5 |
| Void Content, % w/w | 1.0 | 2.2 | 1.8 | .3 | 2.6 | 1.0 | 1.6 |
| Fiber Volume, % w/w | 63.3 | 56.7 | 61.2 | 61.6 | 57.9 | 60.2 | 61.4 |
| Flow, % w/w | 6.5 | 2.3 | 3.8 | 5.0 | 3.7 | 7.1 | 7.2 |
| Processing Pressure | 100 | 100 | 100 | 100 | 100 | 100 | 100 |

What is claimed is:

1. A peroxide curable composition comprising the reaction product of a vinyl polybutadiene reactant having pendant vinyl groups capable of high temperature peroxide cure and a maleimide reactant selected from the group consisting of:

(i) an aliphatic bismaleimide of the general formula:

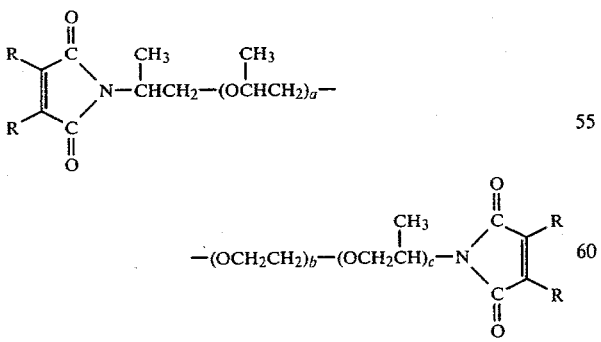

wherein a+c is from about 1 to about 5 and b is from about 13.5 to about 45.5;

(ii) an aliphatic trismaleimide of the general formula:

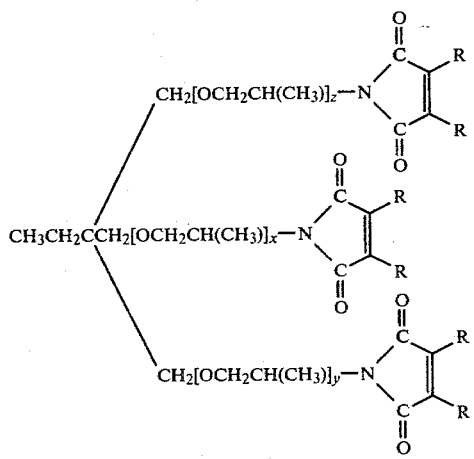

wherein the sum of x, y and z is about at least 1;

(iii) a cycloaliphatic maleimide of the general formula:

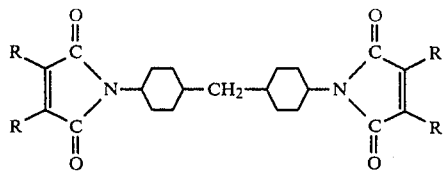

(iv) a cycloaliphatic maleimide of the general formula:

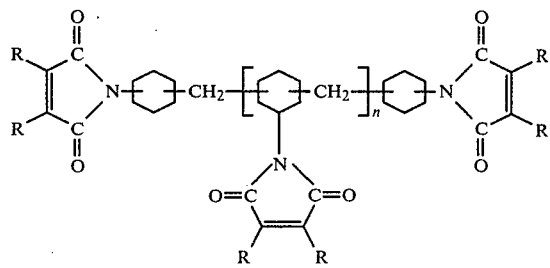

where n is a number from about 0.1 to about 5;

(v) a cycloalphatic maleimide of the general formula:

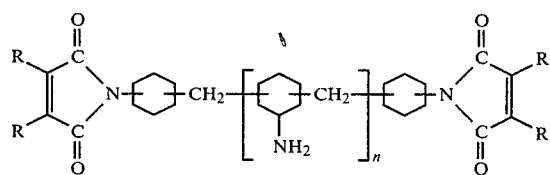

where n is a number from 0.1 to about 5;

(vi) an aromatic maleimide of the general formula:

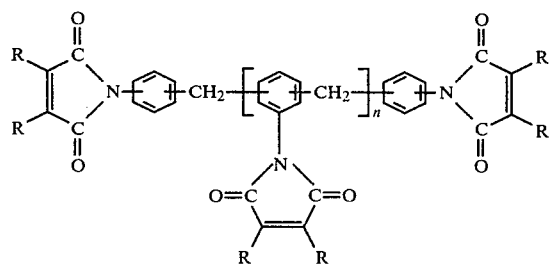

where n is a number from 0.1 to about 5;

(vii) an aromatic maleimide of the general formula:

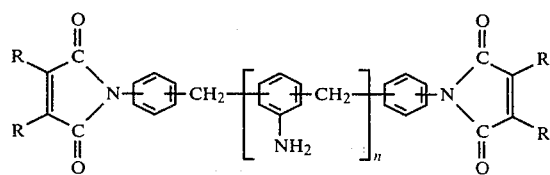

where n is a number from 0.1 to about 5; and where R in each of the above formulas is independently selected from the group consisting of hydrogen, an aliphatic group containing 1 to 2 carbon atoms, a benzenoid radical, and a halogen 2. A composition as claimed in claim 1 in which a peroxide capable of initiating reaction between the vinyl polybutadiene reactant and maleimide reactant is present.

3. A peroxide curable composition comprising the reaction product of a vinyl polybutadiene reactant that is at least about 80 percent 1,2-vinyl polybutadiene segments and a maleimide reactant comprising a mixture of a first maleimide selected from the group consisting of maleimides having the general formula:

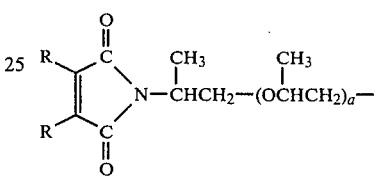

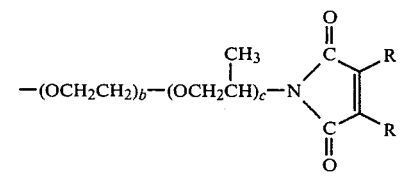

wherein a+c is from about 1 to about 5 and b is from about 13.5 to about 45.5; and

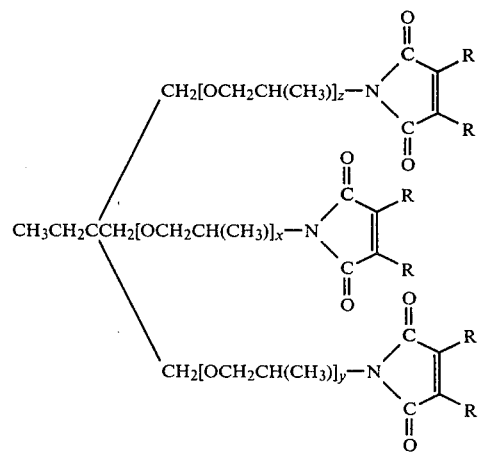

wherein the sum of x, y and z is from about 1 to about 10 and each R is independently selected from the group consisting of hydrogen, an aliphatic group containing 1 to 2 carbon atoms, a benzenoid radical and a halogen; and a second maleimide selected from the group consisting of maleimides having the general formulas:

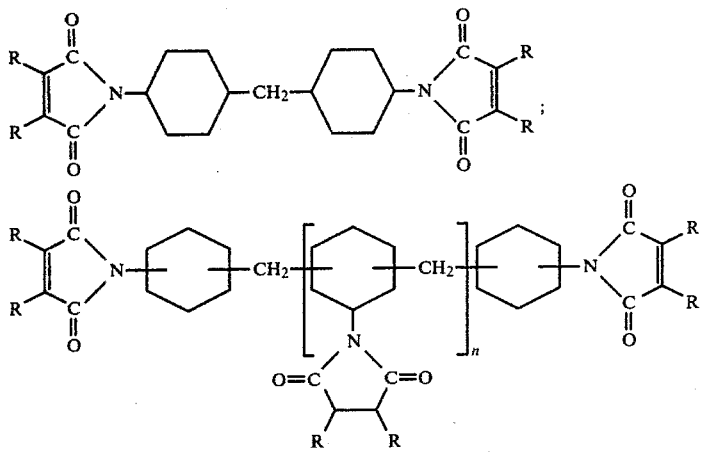

where n is a number from 0.1 to about 5;

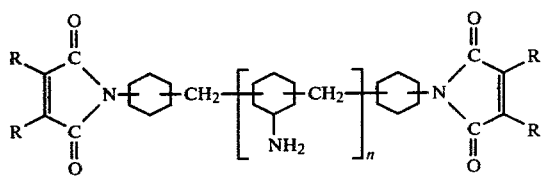

where n is a number from 0.1 to about 5;

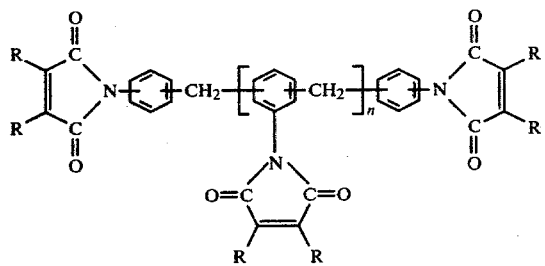

where n is a number from 0.1 to about 5; and

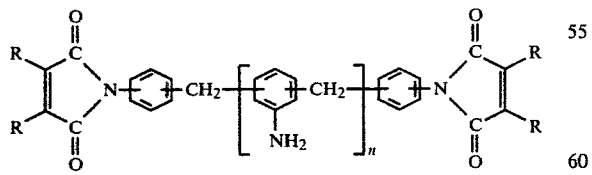

where n is a number from 0.1 to about 5; wherein each R is independently selected from the group consisting of hydrogen, an aliphatic group containing 1 to 2 carbon atoms, a benzenoid radical and a halogen and wherein the weight ratio of the first maleimide to the second maleimide in the mixture being from about 1 to 5 to about 5 to 1.

4. A composition as recited in claim 3 wherein a peroxide capable of initiating reaction between the vinyl polybutadiene reactant and maleimide reactant is present.

5. A peroxide curable compositin as recited in claim 3 wherein the vinyl polybutadiene reactant is at least 90 percent 1,2-vinyl polybutadiene segments, has a molecular weight of about 500 to about 5000.

6. A peroxide curable composition as recited in claim 5 wherein the vinyl polybutadiene is an epoxy terminated vinyl polybutadiene.

7. A peroxide curable composition as recited in claim 6 wherein the epoxy terminated vinyl polybutadiene is the reaction product of vinyl polybutadiene and bix(2,3-epoxypropoxy) benzene.

8. A peroxide curable composition as recited in claim 3 wherein the maleimide reactant is a mixture of an aliphatic maleimide having the general formula:

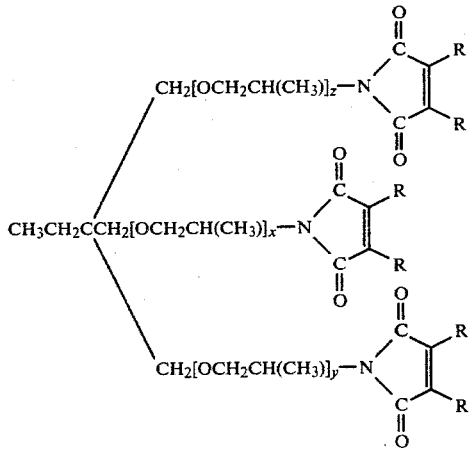

wherein the sum of x, y and z is about 5.3; and a cycloaliphatic maleimide having the general formula:

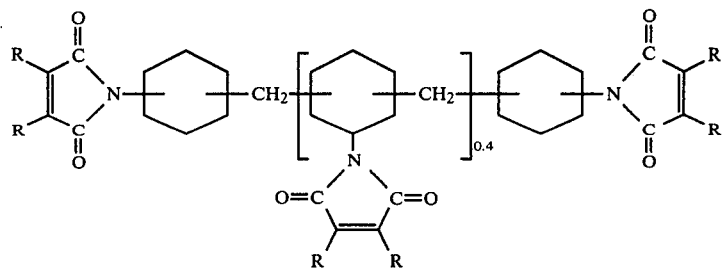

and wherein each R is independently selected from the group consisting of hydrogen, an aliphatic group containing 1 to 2 carbon atoms, a benzenoid radical and a halogen.

9. A peroxide curable composition as recited in claim 3 wherein the maleimide reactant is a mixture of an aliphatic maleimide having the general formula:

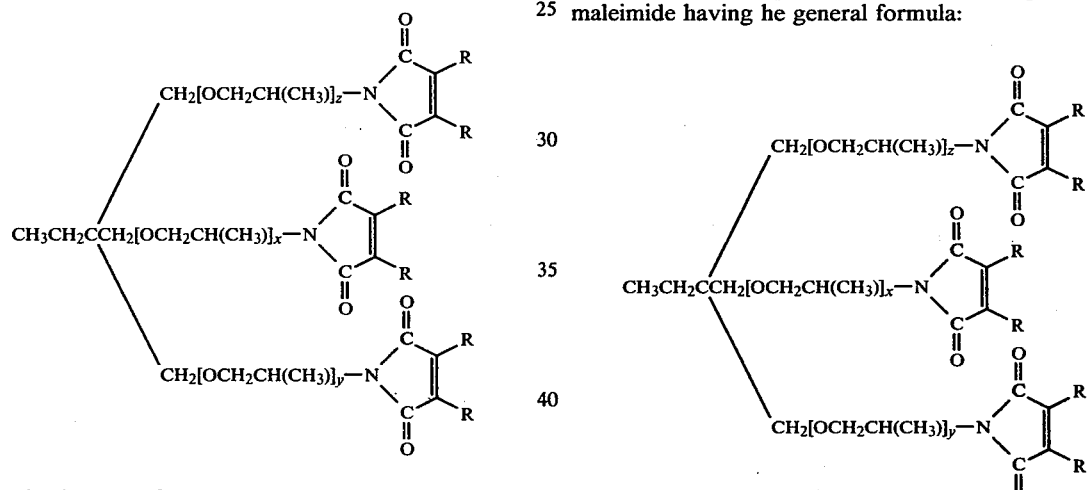

wherein the sum of x, y and z is about 5.3; and an aromatic maleimide having the general formula:

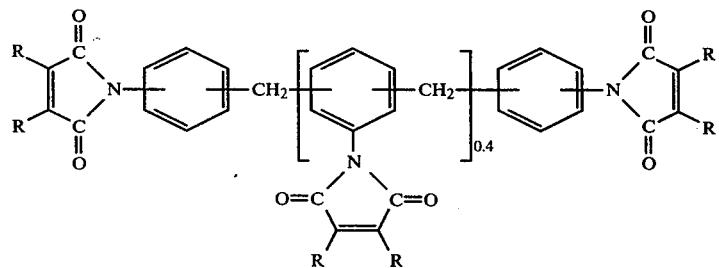

and wherein each R is independently selected from the group consisting of hydrogen, an aliphatic group containing 1 to 2 carbon atoms, a benzenoid radical and a halogen.

10. A peroxide curable composition as recited in claim 8 or 9 wherein R is hydrogen.

11. A peroxide curable composition comprising the reaction product of an epoxide terminated vinyl polybutadiene polymer of at least 80 percent 1,2-vinyl polybutadiene segments, a molecular weight of about 500 to about 5000, and providing pendant vinyl groups capable of high temperature cure, and an aliphatic tris-maleimide having he general formula:

wherein the sum of x, y and z is about at least one and a cycloaliphatic maleimide having the general formula:

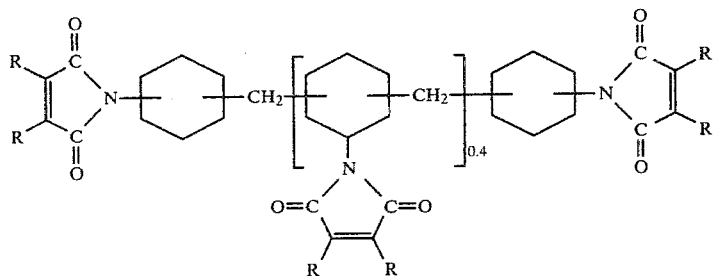

and wherein each R is independently selected from the group consisting of hydrogen, an aliphatic group containing 1 to 2 carbon atoms, a benzenoid radical and a halogen, in combination with at least one peroxide capable of initiating reaction between the vinyl polybutadiene and the maleimides.

12. A peroxide curable composition as recited in claim 11 wherein R is hydrogen.

13. A peroxide curable composition as recited in claim 11 wherein the aliphatic trismaleimide and the cycloaliphatic maleimide are present in a ratio of about 1 to 5 to about 5 to 1 by weight.

14. A peroxide curable composition as recited in claim 8 or 11 wherein the cycloaliphatic maleimide is from about 10 to about 90 percent cis-cis and cis-trans configurations.

15. A peroxide curable composition as recited in claim 14 wherein the cycloaliphatic maleimide forms at least about 80 percent trans-trans configuration upon high temperature curing.

16. A peroxide curable composition as recited in claim 3 or 11 wherein the vinyl polybutadiene comprises up to about 40 percent by weight of the composition.

17. A peroxide curable composition as recited in claim 3 wherein the first maleimide comprises up to about 20 percent by weight of the composition and the second maleimide comprises at least about 50 percent by weight of the composition.

18. A method of producing a thermoset vinyl polybutadiene-maleimide resin comprising the steps of:

(a) reacting a vinyl polybutadiene providing pendant vinyl groups, having a molecular weight of about 500 to about 5000 and at least about 80 percent 1,2-vinyl polybutadiene segments with a maleimide selected from the group consisting of (i) an aliphatic bismaleimide of the general formula:

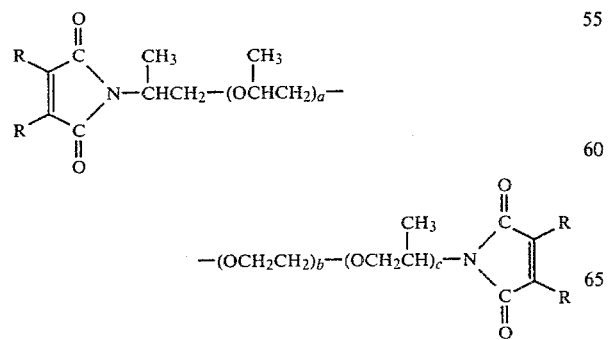

wherein a+c is from about 1 to about 5 and b is from about 13.5 to about 45.5;

(ii) an aliphatic trismaleimide of the general formula:

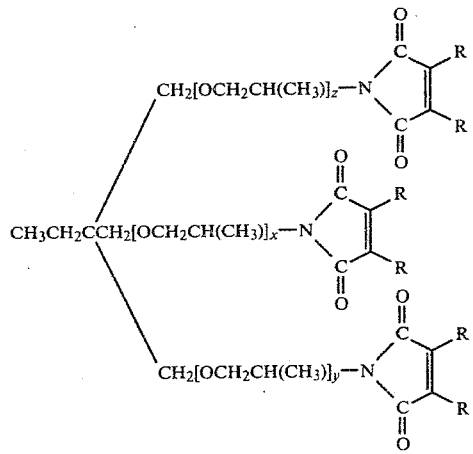

wherein the sum of x, y and z is about at least 1;

(iii) a cycloaliphatic maleimide of the general formula:

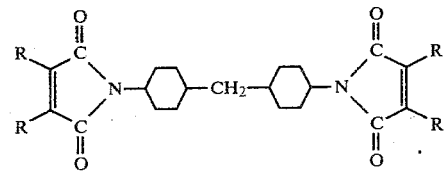

(iv) a cycloaliphatic maleimide of the general formula:

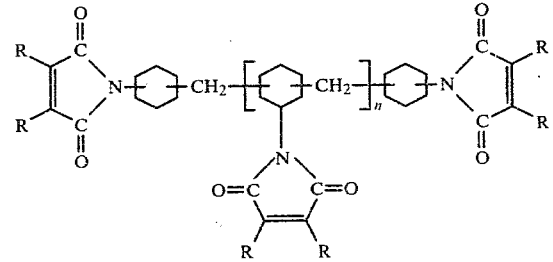

where n is a number from 0.1 to about 5;

(v) a cycloaliphatic maleimide of the general formula:

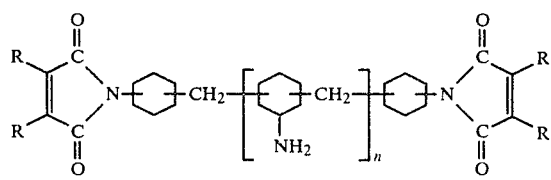
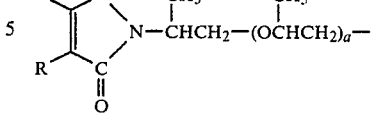

where n is a number from 0.1 to about 5;
(vi) an aromatic maleimide of the general formula:

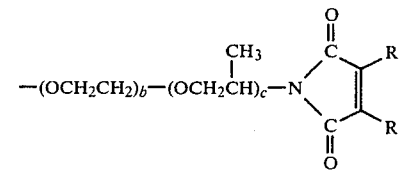

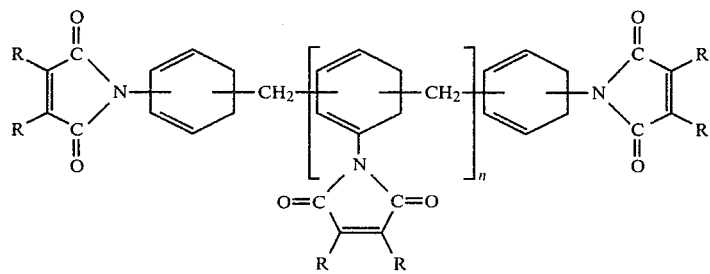

where n is a number from 0.1 to about 5; and
(vii) an aromatic maleimide of the general formula:

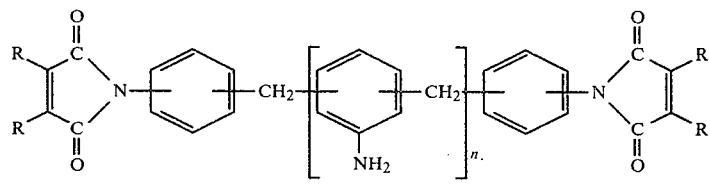

where n is a number from 0.1 to about 5; and wherein each R is independently selected from the group consisting of hydrogen, an aliphatic group containing 1 to 2 carbon atoms, a benzenoid radical and a halogen, and with at least one first peroxide-free radical initiator capable for forming maleimide grafts between vinyl polybutadiene butadiene segments to form a prepolymer; and (b) curing the maleimide grafted vinyl polybutadiene prepolymer by heating in the presence of a second peroixde-free radical initiator to cure the prepolymer through the pendant vinyl groups forming a thermoset resin.

19. A method of producing a hard thermoset vinyl polybutadiene-maleimide resin comprising the steps of:

(a) reacting a vinyl polybutadiene, providing pendant vinyl groups, having a molecular weight of about 500 to about 5000 and at least about 80 percent 1,2-vinyl polybutadiene segments with a mixture of maleimides comprising a first maleimide selected from the group consisting of maleimides having the general formula:

wherein a+c is from about 1 to about 5 and b is from 13.5 to about 45.5; and

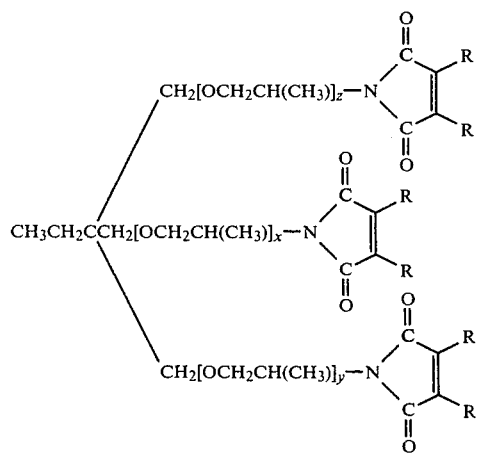

wherein the sum of x, y and z is about at least 1; and a second maleimide selected from the group consisting of maleimides having the general formulas:

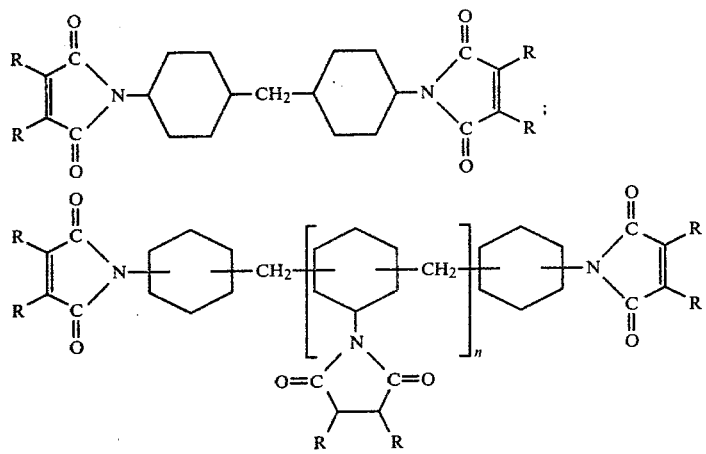

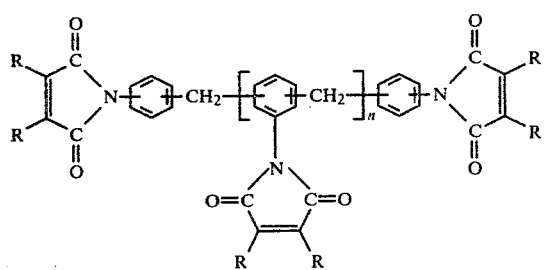

where n is a number from 0.1 to about 5; and

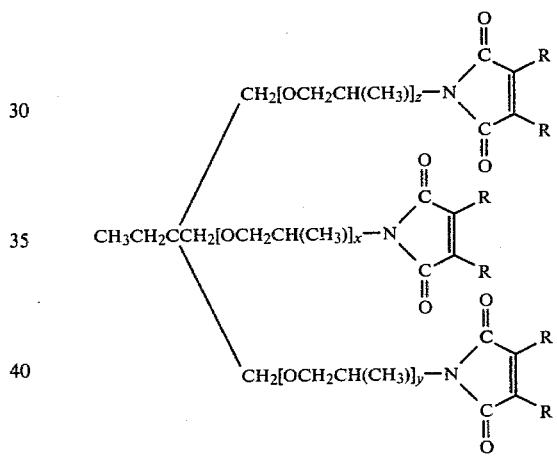

wherein the sum of x, y and z is about at least 1; and the second maleimide is a cycloaliphatic maleimide of the general formula:

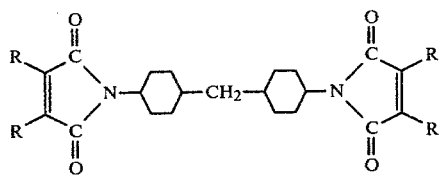

and wherein each R is independently selected from the group consisting of hydrogen, an aliphatic group containing 1 to 2 carbon atoms, a benzenoid radical and a halogen.

22. A method as recited in claim 21 wherein the cycloaliphatic maleimide is from 10 to 90 percent cis-cis and cis-trans configuration at least before reacting with the vinyl polybutadiene and is converted to at least about 80 percent trans-trans configuration after curing the prepolymer to form a thermoset resin.

23. A method as recited in claim 19 wherein the first maleimide has the general formula:

where n is a number from 0.1 to about 5, and wherein each R is independently selected from the group consisting of hydrogen, an aliphatic group containing 1 to 2 carbon atoms, a benzenoid radical and a halogen, and with at least one first peroxide-free radical initiator capable of forming maleimide grafts between vinyl polybutadiene segments to form a prepolymer; and (b) curing the maleimide grafted vinyl polybutadiene prepolymer by heating in the presence of a second peroixde-free radical initiator to cure the prepolymer through the pendant vinyl groups forming a hard thermoset resin.

20. A method as recited in claim 19 wherein the ratio of first maleimide to second maleimide is from about 1 to 5 to about 5 to 1.

21. A method as recited in claim 19 wherein the first maleimide has the general formula:

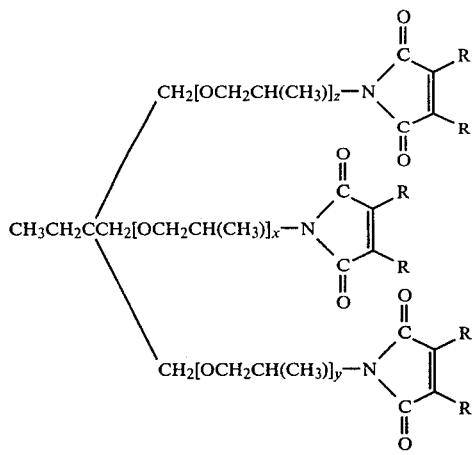

wherein the sum of x, y and z is at least 1 and the second maleimide has the general formula:

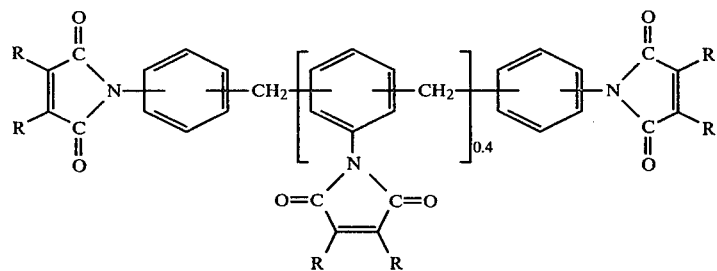

and wherein each R is independently selected from the group consisting of hydrogen, an aliphatic group containing 1 to 2 carbon atoms, a benzenoid radical, and a halogen.

24. A method as recited in claim 19 wherein the vinyl polybutadiene comprises up to about 40 percent by weight of the prepolymer.

25. A method as recited in claim 19 wherein the first maleimide comprises up to about 20 percent by weight of the prepolymer and the second maleimide comprises at least 50 percent by weight of the prepolymer.

26. A peroxide curable composition as recited in claim 3 wherein the maleimide reactant is a mixture of an aliphatic amide having the general formula:

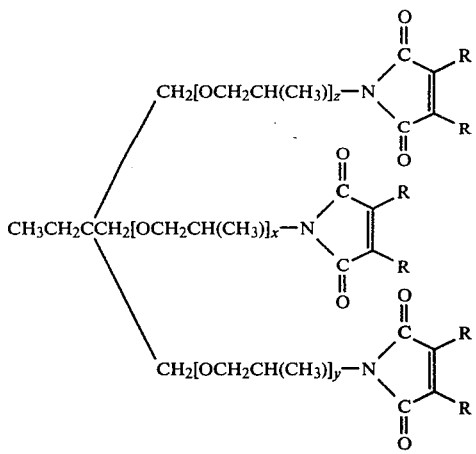

wherein the sum of x, y and z is about at least 1; and a cycloaliphatic maleimide of the general formula:

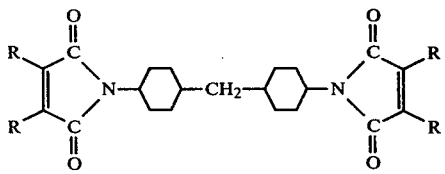

and wherein each R is independently selected from the group consisting of hydrogen, an aliphatic group containing 1 to 2 carbon atoms, a benzenoid radical and a halogen.

27. A peroxide curable composition comprising the reaction product of a vinyl polybutadiene reactant having pendant vinyl groups capable of high temperature peroxide cure and a maleimide reactant selected from the group consisting of:

(i) an aliphatic bismaleimide of the general formula:

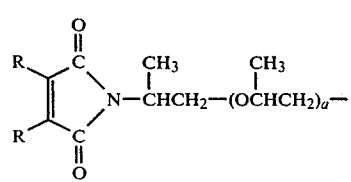

-continued

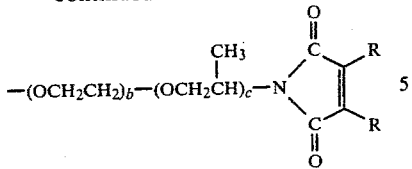

wherein a+c is from about 1 to about 5 and b is from about 13.5 to about 45.5;

(ii) an aliphatic trismaleimide of the general formula:

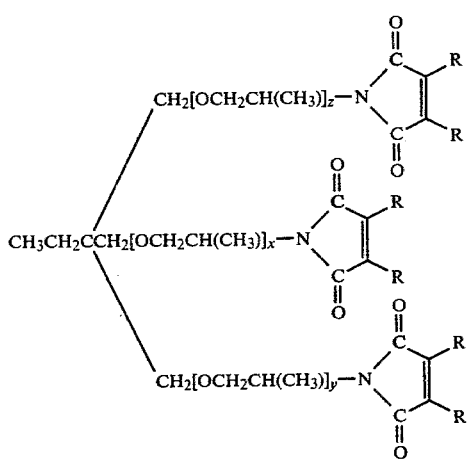

wherein the sum of x, y and z is about at least 1; and where R in each of the above formulas is independently selected from the group consisting of hydrogen, an aliphatic group containing 1 to 2 carbon atoms, a benzenoid radical, and a halogen.

28. A composition as claimed in claim 27 in which a peroxide capable of initiating reaction between the vinyl polybutadiene reactant and maleimide reactant is present.

29. A peroxide curable composition as recited in claim 27 wherein the vinyl polybutadiene reactant is at least 90 percent 1,2-vinyl polybutadiene segments, has a molecular weight of about 500 to about 5000.

30. A peroxide curable composition as recited in claim 27 or 29 wherein the vinyl polybutadiene comprises up to about 40 percent by weight of the composition.

31. A method as recited in claim 19 wherein the first maleimide has the general formula:

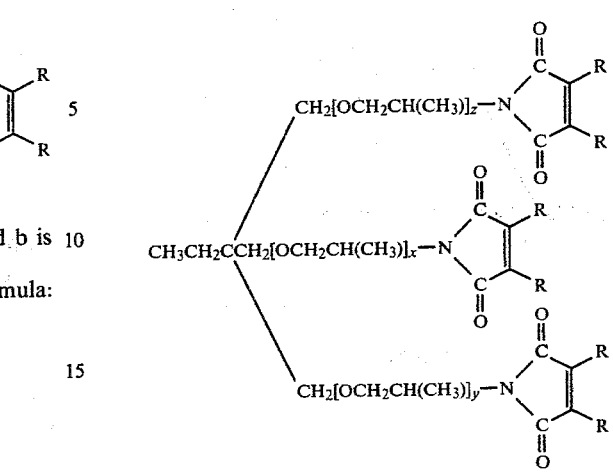

wherein the sum of x, y and z is about 5.3; and the second maleimide has the general formula:

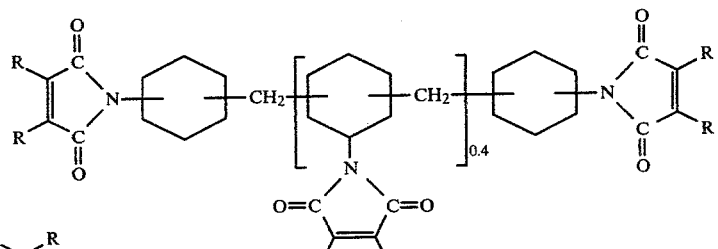

and wherein each R is independently selected from the group consisting of hydrogen, an aliphatic group containing 1 to 2 carbon atoms, a banzenoid radical and a halogen.

32. A method of producing a thermoset vinyl polybutadiene-maleimic resin comprising the steps of:

(a) reacting a vinyl polybutadiene providing pendant vinyl groups, having a molecular weight of about 500 to about 5000 and at least about 80 percent 1,2-vinyl polybutadiene segments with a maleimide selected from the group consisting of (i) an aliphatic bismaleimide of the general formula:

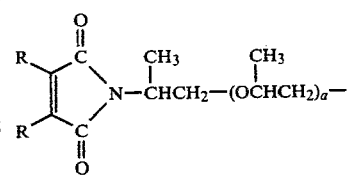

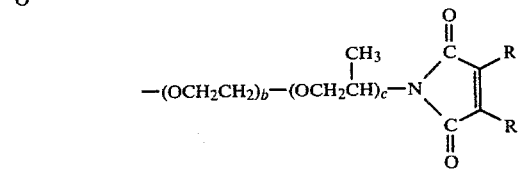

wherein a+c is from about 1 to about 5 and b is from about 13.5 to about 45.5;

(ii) an aliphatic trismaleimide of the general formula:

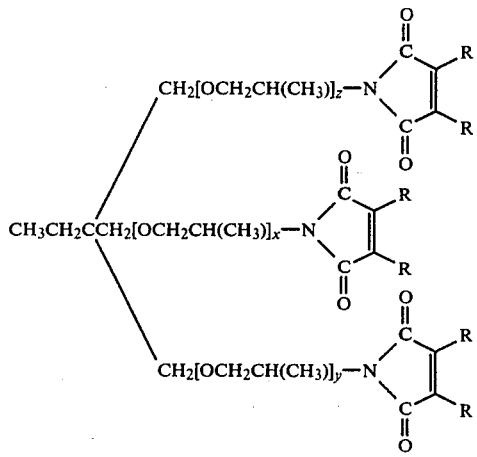

wherein the sum of x, y and z is about at least 1; and wherein each R is independently selected from the group consisting of hydrogen, an aliphatic group containing 1 to 2 carbon atoms, a benzenoid radical and a halogen, and with at least one first peroxide-free radical initiator capable of forming maleimide grafts between vinyl polybutadiene segments to form a prepolymer; and (b) curing the maleimide grafted vinyl polybutadiene prepolymer by heating in the presence of a second peroxide-free radical initiator to cure the prepolymer through the pendant vinyl groups forming a hard thermoset resin.

33. A method as recited in claim 32 wherein the vinyl polybutadiene comprises up to about 40 percent by weight of the prepolymer.

* * * * *